US012450992B2

(12) United States Patent
Adcock et al.

(10) Patent No.: US 12,450,992 B2
(45) Date of Patent: Oct. 21, 2025

(54) SECURITY CARD WITH CODE SCANNER

(71) Applicant: Capital One Services, LLC, McLean, VA (US)

(72) Inventors: Lee Adcock, Midlothian, VA (US); Benjamin Yin, McLean, VA (US); Geeta Shyamala, Herndon, VA (US); Nahid Farhady Ghalaty, Fairfax, VA (US); Patrick Sofo, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 761 days.

(21) Appl. No.: 17/811,786

(22) Filed: Jul. 11, 2022

(65) Prior Publication Data

US 2024/0012894 A1   Jan. 11, 2024

(51) Int. Cl.
| | |
|---|---|
| *G06Q 20/18* | (2012.01) |
| *G06K 7/00* | (2006.01) |
| *G06K 7/08* | (2006.01) |
| *G06K 7/14* | (2006.01) |
| *G08B 7/06* | (2006.01) |
| *H04W 76/10* | (2018.01) |

(52) U.S. Cl.
CPC .............. *G08B 7/06* (2013.01); *G06K 7/0021* (2013.01); *G06K 7/087* (2013.01); *G06K 7/1417* (2013.01); *H04W 76/10* (2018.02)

(58) Field of Classification Search
CPC .......... G06Q 20/18; G06Q 20/34; G08B 7/06; H04W 76/10; G06K 7/0021; G06K 7/1417; G06K 7/087
See application file for complete search history.

(56) References Cited

U.S. PATENT DOCUMENTS

| | | | | |
|---|---|---|---|---|
| 9,026,462 | B2* | 5/2015 | Lin | G06Q 20/3278 |
| | | | | 705/16 |
| 9,092,765 | B2* | 7/2015 | Hicks | G06Q 20/08 |
| 9,235,742 | B1* | 1/2016 | Qaddoura | G06K 7/1417 |
| 9,430,681 | B2* | 8/2016 | Hicks | G07G 1/0081 |
| 9,619,794 | B2* | 4/2017 | Zhou | G06Q 20/34 |
| 9,773,376 | B2* | 9/2017 | Rajput | G07F 17/3251 |
| 9,846,877 | B2* | 12/2017 | Khan | G06Q 20/204 |
| 10,990,962 | B2* | 4/2021 | Wurmfeld | G06Q 20/3552 |
| 11,507,956 | B2* | 11/2022 | Edwards | G06Q 20/4014 |
| 2015/0025969 | A1* | 1/2015 | Schroll | G06Q 20/208 |
| | | | | 705/14.64 |
| 2023/0004629 | A1* | 1/2023 | Aggarwal | G06Q 20/3274 |
| 2023/0336512 | A1* | 10/2023 | Arora | G06F 16/90332 |

* cited by examiner

*Primary Examiner* — Patrick H Mackey
(74) *Attorney, Agent, or Firm* — Foley & Lardner LLP

(57) ABSTRACT

Methods and systems described herein for processing of codes stored within security objects may involve scanning a multitude of codes using the security object. When the codes have been scanned, the security object may store the codes until the mechanism is triggered by, for example, detection of a code processing device. As the security object cycles through the stored codes, it may detect a sound from the code processing device, and then a subsequent sound indicating that a first code and a second code have been processed. The security object may determine whether some codes (e.g., between the first code and the second code) may have been skipped and based on that determination, the security object may update cycling time (e.g., time each code is displayed) and then cycle through the other codes.

20 Claims, 6 Drawing Sheets

SECURITY CARD WITH CODE SCANNER

BACKGROUND

Currently security cards have many uses. For example, security cards are used to access buildings, authenticate with computing systems, and perform transactions. Generally, these cards are used with card readers that read data from the card and perform an action depending on the context of the usage. Currently, libraries and other institutions started using security cards to track which books or other items have been checked out (e.g., borrowed) and to whom. However, users still need to go to a librarian, hand the librarian the security card, and wait for the librarian to scan the books into the system in order to track which books a user has borrowed. This process is time consuming and inefficient. In addition, this process requires a librarian to spend time performing this function instead of performing other important tasks required by the library.

SUMMARY

Methods and systems are described herein for enabling processing of codes stored within security objects. A security object may be a security card with a built-in scanner (e.g., a barcode scanner, a quick response (QR) code scanner, a camera, or another suitable scanner). A security object may also be a fob or another suitable object. The security object may also have a built-in processor or processors. In some embodiments, the mechanism for enabling processing of codes stored within security objects may involve scanning a multitude of codes using the security object. When the codes have been scanned, the security object may store the codes until the mechanism is triggered by, for example, detection of a code processing device. As the security object cycles through the stored codes, it may detect a sound from the code processing device and then a subsequent sound indicating that a first code and a second code have been processed. The security object may determine whether some codes (e.g., between the first and the second code) may have been skipped and based on that determination, the security object may update cycling time (e.g., time each code is displayed) and then cycle through the other codes.

In particular, the security object may store a plurality of codes within a security object. For example, the security object may be a library card (e.g., a plastic card) equipped with a scanning device (e.g., a camera, barcode scanner, or another suitable scanning device) and a display device enabled to display the scanned codes. A user of the card may scan a code (e.g., a barcode, QR code, or another suitable code) for each book the user wishes to check out.

The security object may detect a code processing device. For example, a code processing device may be a card reader that enables reading the stored code. In some embodiments, the code processing device may be a surface onto which the user places the library card. Furthermore, the code processing device may supply power to the library card. Based on detecting the code processing device, the security object may repeatedly cycle through the plurality of codes. Each cycle may include sequentially displaying, on a display associated with the security object, each code of the plurality of codes. For example, the security object may have five codes stored representing five books. Thus, the security object may display each of the five codes sequentially for, for example, one second each.

While repeatedly cycling through the plurality of codes, the security object may detect a first signal emitted by a sound emitter associated with the code processing device. In some embodiments, the code processing device may be attached to a computing device with a speaker. Thus, every time the code processing device scans a code displayed by the security object, the code processing device may emit a sound indicating processing is completed. To continue with the example above, the user of the library card may put the books that he or she desires to check out into a bag and bring the card to a checkout station. The user may place the card on a surface of the checkout station which may detect the library card and start reading the codes from the display of the library card. In some embodiments, the user may insert the library card into a specialized reader that is able to read the codes displayed by the card.

Based on detecting the first signal, the security object may store an indication of a first code of the plurality of codes displayed when the first signal is emitted. For example, when the library's checkout station scans a code, the checkout station may generate a sound (e.g., a beep). When the sound is generated, the security object may determine the code that was displayed at the time of the sound.

While repeatedly cycling through the plurality of codes, the security object may detect a second signal emitted by the sound emitter. For example, when the security object (e.g., the library card) may detect the first sound, it may continue to cycle through the image and detect a second sound (e.g., a second beep). Based on detecting the second signal, the security object may determine a second code displayed when the second signal is emitted. For example, the security object (e.g., the library card) may detect the second sound (e.g., second beep) and store an indicator of the code that was being displayed at the time of the second beep.

The security object may then determine whether one or more codes were displayed by the security object between the first code and the second code. For example, the library card may have originally stored five codes for five different library books that the user wanted to check out. When the library card detects the checkout station, the library card may start cycling through the five images (e.g., displaying each image sequentially for a particular amount of time). When the library card detects that a first beep, the library card may store an indicator of the image that was displayed at the time of the first beep (e.g., an index number of the image such as index_1). When the library card detects the second beep, the library card may store an indicator of the image that was displayed at the time of the second beep (e.g., an index number of the image such as index_3). Thus, the library card may determine that there was an image that was not processed (e.g., image indicator by index_2). That is, the image was skipped because the checkout station was not able to process the images quickly enough.

Based on determining that the one or more codes were displayed by the security object between the first code and the second code, the security object may generate a display time interval. The display time interval enables the code processing device to read each code of the plurality of codes in sequence without failing to read any codes. To continue with the example above, the library card may determine that an image indicated by index_2 indicator has been skipped. Accordingly, the library card may determine a time between the first beep and the second beep. The time between the first beep and the second beep may be 1.5 seconds. Thus, the library card may set a 1.5 second interval for displaying each image.

The security object may cycle through the plurality of codes using the display time interval. For example, if the library card determines that the time interval should be 1.5 seconds, the library card may cycle through the other images displaying each image for 1.5 seconds. In some embodiments, the library card may remove the images associated with index_1 and index_3 indicators because they have already been scanned by the checkout station.

In some embodiments, the security object may be paired with a mobile device (e.g., a smart phone) and may enable an application on the mobile device to adjust the codes stored on the security card. For example, if the user changed his/her mind about checking out a particular book, the user may instruct the smart phone to remove an associated coded from the library card. In some embodiments, the mobile device may be used to add certain codes to the security object.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
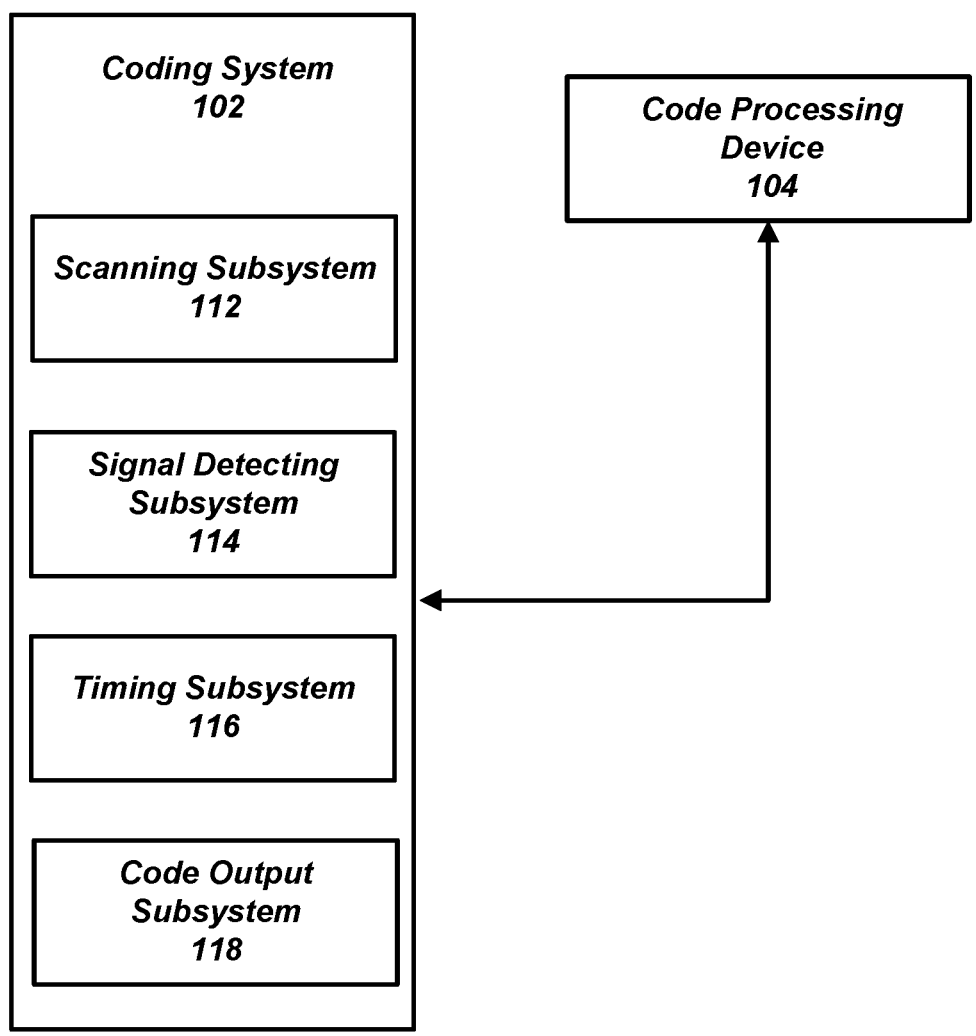
FIG. 1 shows an illustrative system for enabling processing of codes stored within security objects, in accordance with one or more embodiments of this disclosure.

FIG. 1 shows environment 100, which includes coding system 102 and code processing device 104. Coding system 102 may execute instructions for enabling processing of codes stored within security objects. Coding system 102 may include software, hardware or a combination of the two.

For example, coding system 102 may be built into a chip embedded into a security object (e.g., a security card, a transaction card such as a credit card, a fob, or another suitable object). Thus, although the current disclosure is discussed in terms of transaction cards, the same systems and methods may be applied to any object that may be in a user's possession.

Code processing device 104 may be a computing device with an associated card reader and/or a code processing surface. The card reader may be a physical object into which the transaction card is inserted while the code processing surface may be a surface onto which a security card or a fob may be placed so that codes can be scanned from the display. In some embodiments, code processing device 104 may be a point-of-sale system (e.g., an electronic cash register) that is enabled to both process transactions using transaction cards (e.g., credit cards, debit cards, etc.) and read codes displayed by the transaction card. Furthermore, the security object may be a transaction card (e.g., a credit card, a debit card, or another suitable object enabling purchasing goods and/or services). The transaction card may be read by a card reader built into, for example, a point-of-sale system (electronic cash register).

In some embodiments, coding system 102 may detect that it was placed onto a code processing surface. For example, coding system 102 may use a scanner (e.g., a camera) to detect a particular pattern indicating that the security object was placed onto the code processing surface. Based on determining that the security object was placed onto the code processing surface, coding system 102 may draw power from the code processing surface.

In some embodiments, coding system 102 may be used to improve the process of purchasing goods. Currently, when an individual goes to acquire goods, he or she picks those goods from a shelf or a rack and places those goods into a container (e.g., a cart). The individual then walks to a checkout location where another individual scans a tag associated with each item and then accepts payment (e.g., via a credit card). This process is inefficient and time consuming and also requires unnecessary use of people's time. Accordingly, the current disclosure enables automatic scanning and checkout when purchasing goods.

Coding system 102 may store a plurality of codes within a security object. Coding system 102 may receive the plurality of codes using scanning subsystem 112. Scanning subsystem 112 may include software components, hardware components, or a combination of both. For example, scanning subsystem 112 may include a scanning device (e.g., a camera, QR code scanner, barcode scanner, or another suitable scanner) and software for receiving scanning data from the scanner. For example, coding system 102 may be built into a transaction card that is equipped with a scanner and a code display. The stored codes may be QR codes, bar codes, or other suitable codes. In some embodiments, the codes may represent stock keeping unit (SKU) numbers. Thus, an individual attempting to acquire an item may scan the SKU number so that he or she can be charged for the item.

In some embodiments, each stored code may have an associated identifier (e.g., an index number). The identifier may be a decimal number, a hexadecimal number, or another suitable number). For example, as a user is scanning codes using the security device, the first scanned code may be associated with the number one, the second code may be associated with the number two, etc. In some embodiments, the last code scanned may be displayed on the display of the security object.

Figure 2:
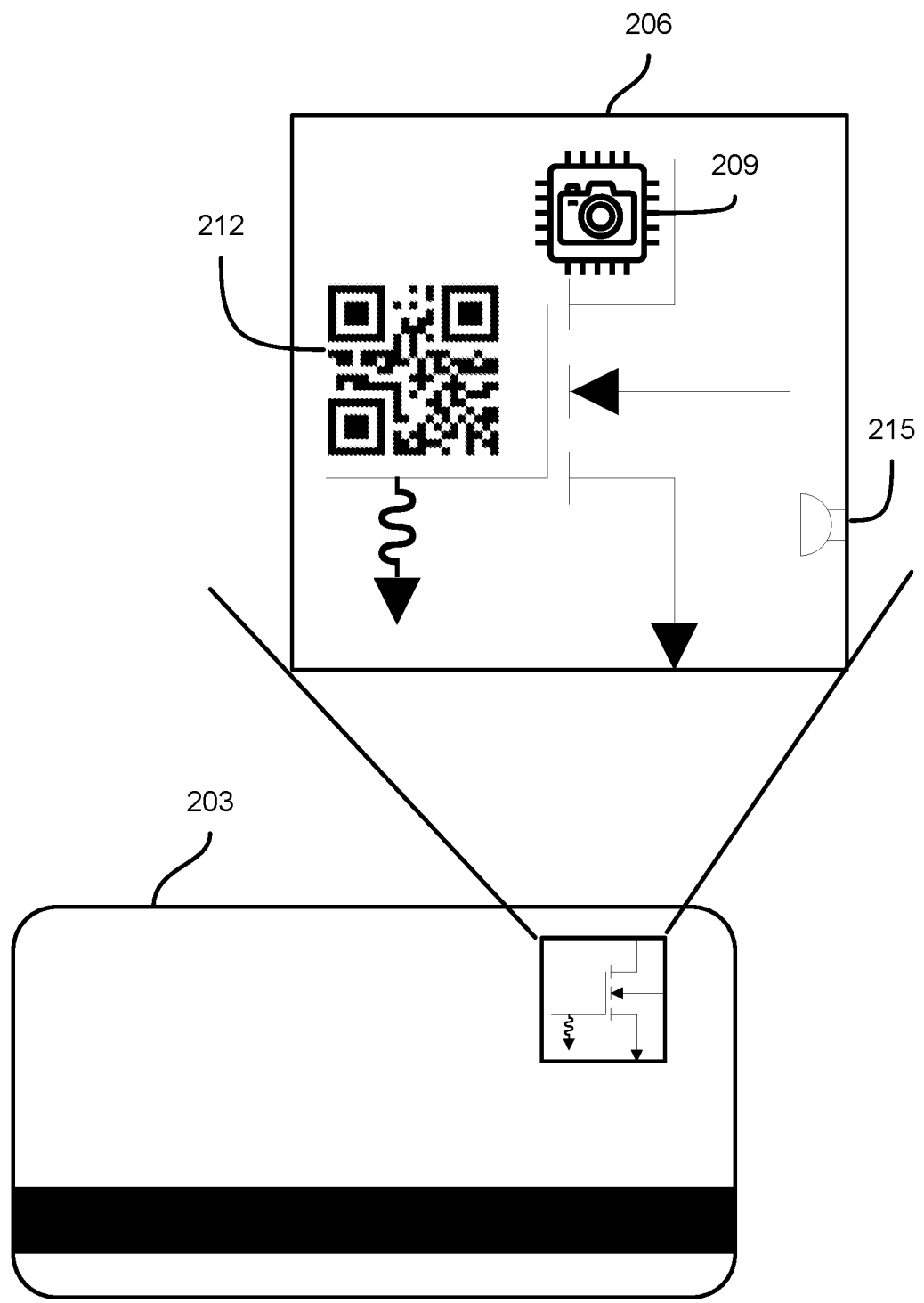
FIG. 2 illustrates an example of a security card with a built-in code reader and code display, in accordance with one or more embodiments of this disclosure.

FIG. 2 illustrates an example of such a transaction card 203. Transaction card 203 may be a credit card or a debit card that includes processor 206 (e.g., Europay, Mastercard and Visa (EMV) chip) and/or a magnetic stripe for processing payments. Processor 206 may include scanner 209 that is built into the same board as the processor. As discussed above, scanner 209 may be a camera, a barcode scanner, a QR code scanner, or another suitable scanner). Chip 206 may also include a display 212. Display 212 may be any kind of display, for example, a liquid crystal display, Organic Light Emitting Diode display or an electronic ink display. It should be noted that a display that draws less power would be advantageous. In one example, scanner 209 may be a camera capable of reading QR codes, while display 212 may be a display capable of displaying QR codes. Furthermore, processor 206 may be equipped with microphone 215 that is enabled to capture audio emissions (e.g., sounds, tones, etc.).

Figure 3:
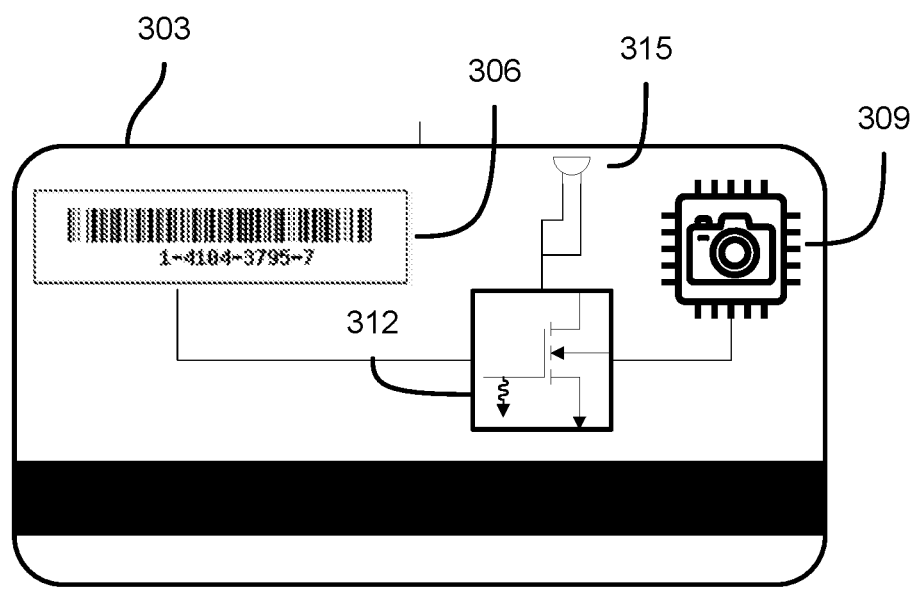
FIG. 3 illustrates another example of a security card with a built-in code reader and code display, in accordance with one or more embodiments.

FIG. 3 illustrates another example of a transaction card. Transaction card 303 may include a barcode display 306 and a barcode scanner 309. Barcode display 306 and barcode scanner 309 may be connected (e.g., electronically) to a processor 312. Processor 312 may be, for example, an EMV chip modified to perform operations discussed in this disclosure. Furthermore, transaction card 303 may be equipped with microphone 315 that is enabled to capture audio emissions (e.g., sounds, tones, etc.). Microphone 315 may be connected with processor 312 and may transmit sound data to processor 312.

Coding system 102 may (via signal detecting subsystem 114) detect a code processing device. Signal detecting subsystem 114 may include software components, hardware components, or a combination of both. For example, signal detecting subsystem 114 may include a wireless network processor that is able to detect wireless signals (e.g., Wi-Fi, near-field communication (NFC) and/or other suitable signals) and software for receiving data from the network processor. In some embodiments, the code processing device may be a point-of-sale device (e.g., an electronic cash register). The code processing device may include (or may be connected to) a scanner enabled to scan codes and pass those codes on. In some embodiments, the code processing device may be a code processing surface.

Figure 4:
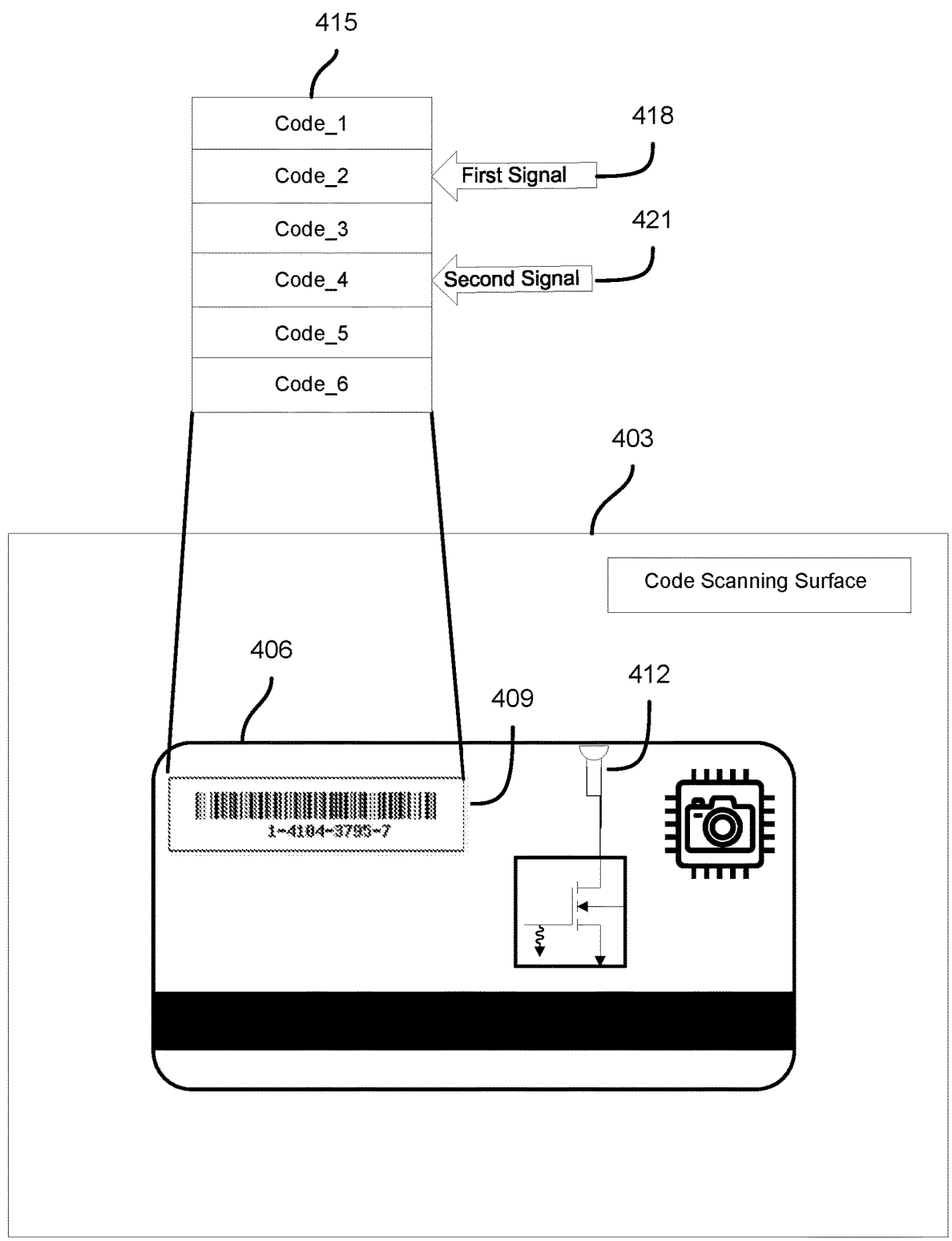
FIG. 4 illustrates a security card on top of a code processing surface, in accordance with one or more embodiments.

FIG. 4 illustrates a code processing surface 403 with a security object 406 (e.g., a transaction card) placed on top of the code processing surface. FIG. 4 illustrates the code processing surface from the bottom, where a scanning device (e.g., a camera, a barcode scanner, or another suitable device) may scan the codes being displayed by security object 406 on display 409. Coding system 102 may have access to its own power source (e.g., a battery attached to a transaction card). Another transaction device may be a fob having a battery. Furthermore, the security object may be enabled to draw power from the code processing device (e.g., code processing surface 403). That is, when the security object scans the codes, it may use an internal battery, but when the security object is displaying the codes, it may use power from the code processing device, thereby increasing the battery life of the battery.

Based on detecting the code processing device, coding system 102 (e.g., via code output subsystem 118) may repeatedly cycle through the plurality of codes. Each cycle may include sequentially displaying, on a display associated with the security object, each code of the plurality of codes. Code output subsystem 118 may include software components, hardware components or a combination of both. For example, code output subsystem 118 may include a display (e.g., an electronic ink display, an LCD display, an Organic Light Emitting Diode (OLED) display or another suitable display) and software for operating the display (e.g., sending codes to the display).

For example, as illustrated in FIG. 4, coding system 102 may cause (e.g., via code output subsystem 118) code display 409 to cycle through a plurality of stored bar codes. Each bar code may be displayed for a particular period of time (e.g., one-half a second, one second, two seconds, etc.). To continue with the example above, when an individual attempting to acquire goods scans each good into the security object, those codes may be stored until the individual walks up to a register to pay for those goods. The register may be equipped with a code processing device (e.g., code processing surface). When the security object (e.g., credit card) detects that it is in the vicinity of the code processing device (e.g., placed on top of the code processing surface), the security object may start cycling through the codes. In some embodiments, instead of cycling through the codes, the security object may display the first code to be scanned by the code scanning device. In some embodiments, the security object may display the last code that was scanned into the device without cycling through all the codes.

While repeatedly cycling through the plurality of codes, coding system 102 may detect (e.g., via signal detecting subsystem 114) a first signal emitted by a sound emitter associated with the code processing device. For example, the code processing device may include a speaker or another suitable sound emitter. Furthermore, the code processing device may be configured to emit a sound every time a code is scanned. Thus, while coding system 102 is cycling through the stored codes, the code processing device may be attempting to scan the code. When the code processing device scans the code, the security object (e.g., via a microphone 412) may detect that sound. In some embodiments, instead of cycling through the codes, coding system 102 may display (e.g., via code output subsystem 118) the first code in the set and wait until that code is scanned (e.g., until the first sound is emitted).

In some embodiments, instead or in addition to emitting a sound, the code processing device (e.g., code processing surface) may emit a particular light signal (e.g., visible light, infrared light or another suitable light). A scanning device (e.g., a camera) associated with a security object may detect the light signal. For example, if the security device is placed on top of a code processing surface, a component of the code processing surface may emit a particular light to indicate that a code was scanned. In some embodiments, it may be advantageous to use a light emitter instead of sound because light travels faster and thus may enable quicker detection of a scanned code. In addition, a security device may use the same scanner as that for scanning code to detect a light emission (e.g., without needing a microphone to detect sound signals).

Based on detecting the first signal, coding system 102 may store an indication of a first code of the plurality of codes displayed when the first signal is emitted. For example, the security object may store an index or an identifier of each code while that code is displayed. Thus, when the security object changes the code displayed, it may update the identifier. Accordingly, when the security object detects the first signal, it may record the identifier or create a pointer to the identifier associated with the displayed code. For example, coding system 102 may cycle through codes illustrated in table 415 of FIG. 4. Each code may have an associated identifier. Thus, when the first signal is detected, signal detecting subsystem 114 may generate a pointer 418.

While repeatedly cycling through the plurality of codes, coding system 102 may detect (e.g., via signal detecting subsystem 114) a second signal emitted by the sound emitter. That is, as the code processing device scans the second code, it may transmit a second signal (e.g., sound) which may be detected by the security object (e.g., via signal detecting subsystem 114). For example, coding system 102 may be scanning codes of items that the user earlier scanned into a transaction card for acquiring those items. The second signal (e.g., a second sound) may indicate that the second code has been scanned.

Based on detecting the second signal, coding system 102 (e.g., via signal detecting subsystem 114) may determine a second code displayed when the second signal is emitted. For example, signal detecting subsystem 114 may store an indicator of the code that was displayed when the second signal was detected. In some embodiments, as shown in FIG. 4, coding system 102 may generate a pointer 412 pointing to an identifier associated with the second code. As in relation to detection of the first code, coding system 102 may generate a pointer to a code when the code is first displayed. When the next code is displayed, coding system 102 may update the pointer to the next code.

After the second signal is detected, coding system 102 may determine (e.g., via timing subsystem 116) whether one or more codes were displayed by the security object between the first code and the second code. Timing subsystem 116 may include software components, hardware components or a combination of both. For example, timing subsystem 116 may access timing circuitry and/or time in memory and use one or more processors to perform operations. For example, timing subsystem 116 may access a pointer to the first code (e.g., pointer 418) and determine an identifier associated with that pointer. Timing subsystem 116 may then access a pointer to the second code (e.g., pointer 412). Timing subsystem 116 may then determine whether those pointers correspond to consecutive codes. If those pointers do not correspond to consecutive codes, coding system 102 may determine that one or more codes were displayed between the first code and the second code. In some embodiments, coding system 102 may not be cycling through codes, but instead displaying each code until a signal is detected (e.g., a sound is detected). As signals are detected, coding system 102 may display the next code for processing by the code processing device (e.g., code processing surface 403).

Based on determining that the one or more codes were displayed by the security object between the first code and the second code, coding system 102 may generate (e.g., via timing subsystem 116) a display time interval. The display time interval enables the code processing device to read each code of the plurality of codes in sequence without failing to read any codes. For example, coding system 102 (e.g., via timing subsystem 116) may store a time when the first signal was detected and the time when the second signal was detected. Based on the two times, coding system 102 may determine a time interval needed by the code scanning device to scan one code. Thus, coding system 102 may determine an elapsed time between the first signal emitted by the code processing device and the second signal emitted by the code processing device and generate the display time interval based on the elapsed time. Coding system 102 may then adjust the display time of each code when cycling through the rest of the codes of the plurality of codes. Thus, coding system 102 may cycle (e.g., via code output subsystem 118) through the plurality of codes using the display time interval.

In some embodiments, coding system 102 may remove the first code and the second code from the cycle prior to cycling through the other codes. For example, coding system 102 may determine that those codes have already been scanned by code processing device 104 and thus, if they are scanned again, duplicate items may appear on the scan. Accordingly, those codes are removed from the list. Furthermore, as coding system 102 detects other signals, indicating that codes are scanned, coding system 102 may remove those codes from cycling until all codes are scanned. In some embodiments, when all codes are scanned, coding system 102 may display a predetermined code to indicate to the code processing system that all codes are scanned.

In some embodiments, a user may desire to remove or add a duplicate code to the plurality of codes. To perform those operations, some security devices may enable a user to interface with the device. For example, a fob may include one or more bottoms for performing these operations. However, some security devices (e.g., transaction cards) may not include user interfaces or physical bottoms for interfacing with coding system 102. In those instances, security devices may connect with other user devices (e.g., smart phones) to perform these operations.

In some embodiments, coding system 102 may detect a connection request from a mobile device associated with the security object. For example, a mobile device may be paired with the security device (e.g., with a transaction card) via Wi-Fi, Bluetooth, NFC or another suitable connection. The pairing may include authentication and authorization of the mobile device to prevent unauthorized users from connecting to the security object. Coding system 102 may transmit the plurality of codes to the mobile device. The mobile device may include an application that enables editing codes (e.g., duplicating codes, removing codes, etc.). The user may be enabled to review the codes and perform operations that are desired (e.g., remove one or more codes). For example, a user may have scanned a particular item to purchase the item from a store. However, at some point, the user may have changed his or her mind. Thus, the user may desire to remove an item from the list while maintaining the other items. In some embodiments, the user may desire to buy two items instead of one, but the user has not scanned the item twice. Accordingly, the user may duplicate an item in the list. When the user is done updating the items, the user may cause the mobile device to send the updated set of codes to the security device.

Thus, coding system 102 may receive from the mobile device an instruction to remove a code of the plurality of codes. The instruction may include the code to remove. In some embodiments, coding system 102 may receive an instruction to repeat a code of the plurality of codes. The instruction may include the code to repeat. Based on the instruction, coding system 102 may remove or duplicate the code from the plurality of codes. For example, a command identifier A transmitted with the code may indicate to remove a code while command identifier B transmitted with the code may indicate to duplicate the code. In some embodiments, instead of transmitting remove and duplicate commands, the mobile device may transmit a new list of items to the security object to store.

Computing Environment

Figure 5:
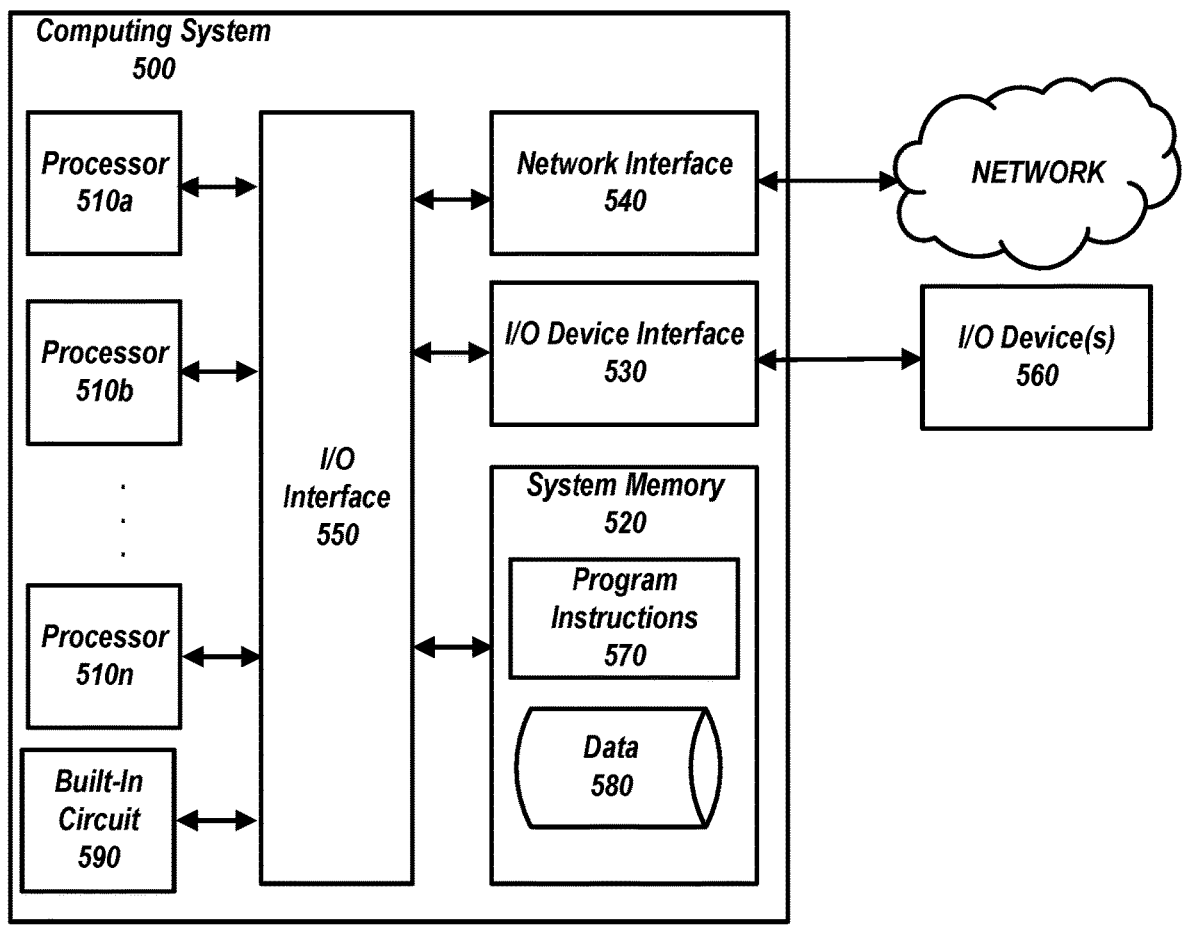
FIG. 5 shows an example computing system that may be used in accordance with one or more embodiments.

FIG. 5 shows an example computing system that may be used in accordance with some embodiments of this disclosure. In some instances, computing system 500 may be built into a transaction card or another suitable device (e.g., a fob). A person skilled in the art would understand that those terms may be used interchangeably. The components of FIG.

5 may be used to perform some or all operations discussed in relation with FIGS. 1-4. Furthermore, various portions of the systems and methods described herein may include or be executed on one or more computing systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530 and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical and I/O operations of computing system 500. A processor may execute code (e.g., processor firmware, a protocol stack, a database management system, an operating system or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes such as logic flows, described herein, may be performed by one or more programmable processors executing one or more computer programs to perform functions by operating on input data and generating corresponding output.

I/O device interface 530 may provide an interface for connection of one or more I/O devices 560 to computing system 500. I/O devices may include card readers, transaction terminals and other computing devices able to read transaction cards and other suitable devices (e.g., fobs).

Network interface 540 may include a network adapter that provides for connection of computing system 500 to a network. Network interface 540 may facilitate data exchange between computing system 500 and other devices connected to the network. Network interface 540 may support a contact connection or wireless communication.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device or any combination thereof. Non-transitory computer-readable storage media may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560 and/or other peripheral devices. I/O interface 550 may perform protocol, timing or other data transformations to convert data signals from one component (e.g., system memory 520) into a format suitable for use by another component (e.g., processors 510a-510n). I/O interface 550 may include support for devices attached through various types of peripheral buses, such as a variant of the peripheral component interconnect (PCI) bus standard or the universal serial bus (USB) standard. Computing system 500 may include a built-in circuit 590 for disabling the computing system.

Operation Flow

Figure 6:
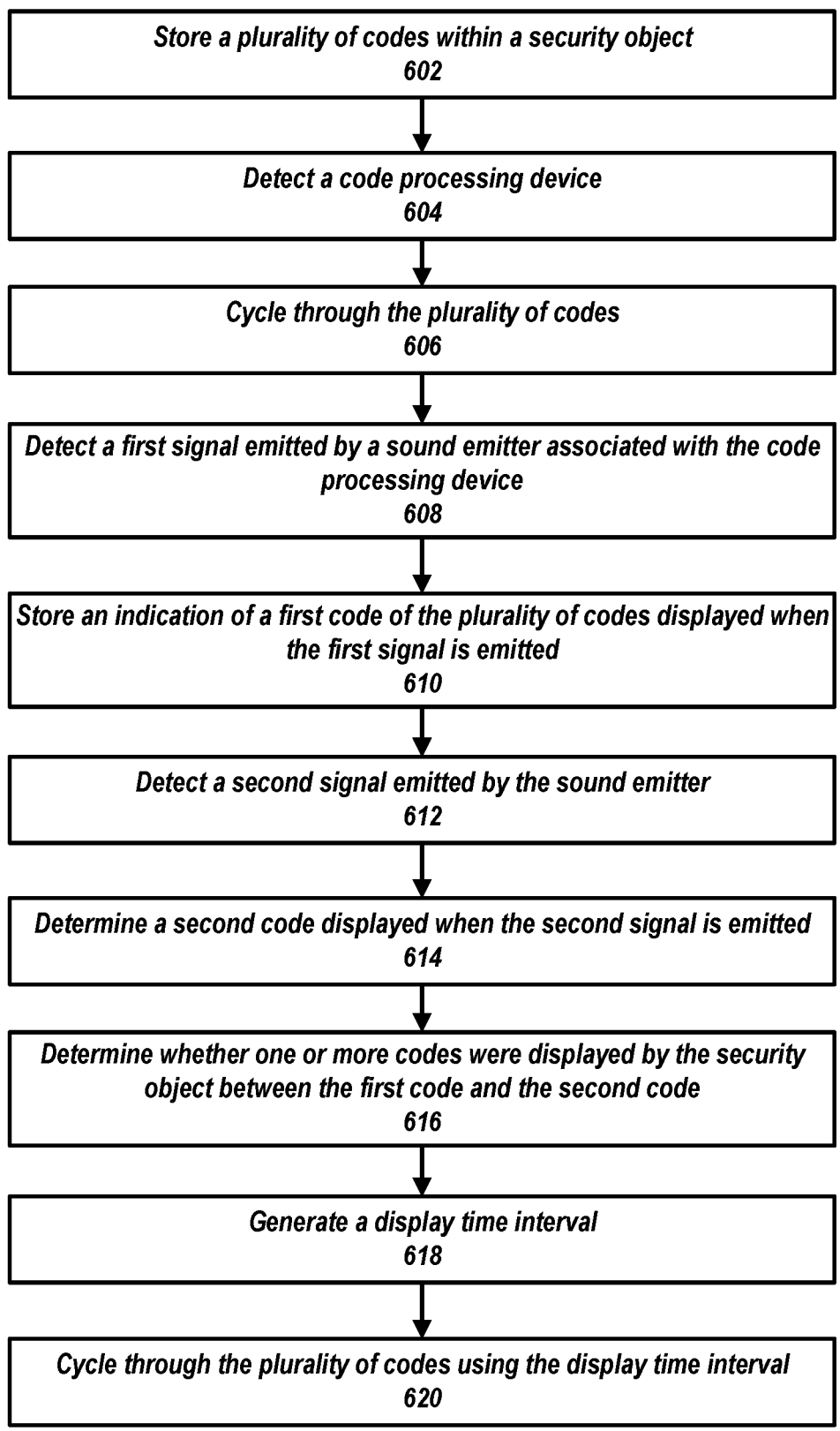
FIG. 6 is a flowchart of operations for enabling processing of codes stored within security objects, in accordance with one or more embodiments.

FIG. 6 is a flowchart 600 of operations for enabling processing of codes stored within security objects. The operations of FIG. 6 may use components described in relation to FIG. 5. In some embodiments, coding system 102 may include one or more components of computer system 500.

At 602, coding system 102 stores a plurality of codes within a security object. For example, coding system 102 may receive the plurality of codes via I/O device interface 530 such that each code is scanned by an associated scanning device. At 604, coding system 102 detects a code processing device. Coding system 102 detects the code processing device using network interface 540 and/or I/O device interface 530 using processor 510a. At 606, coding system 102 cycles through the plurality of codes. Coding system 102 may retrieve each code from system memory 520 and use one or more processors 510a, 510b and/or 510n to perform this operation.

At 608, coding system 102 detects a first signal emitted by a sound emitter associated with the code processing device. For example, one of the I/O devices 500 may be a microphone connected to computing device 500 via I/O device interface 530. Thus, the microphone may detect the signal (e.g., a sound signal) and pass signal data through I/O device interface 530 to a processor 501a and/or 510b, etc. At 610, coding system 102 stores an indication of a first code of the plurality of codes displayed when the first signal is emitted.

For example, coding system 102 may store the first code in system memory 520. At 612, coding system 102 detects a second signal emitted by the sound emitter. For example, one of the I/O devices 500 may be a microphone connected to computing device 500 via I/O device interface 530. Thus, the microphone may detect the signal (e.g., a sound signal) and pass signal data through I/O device interface 530 to a processor 501a and/or 510b, etc.

At 614, coding system 102 determines a second code displayed when the second signal is emitted. For example, coding system 102 may use one or more processors 510a, 510b and/or 510n to perform this operation and store an indication of the second code displayed in system memory 520. At 616, coding system 102 determines whether one or more codes were displayed by the security object between the first code and the second code. For example, coding system 102 may use one or more processors 510a, 510b and/or 510n to perform this operation. At 618, coding system 102 generates a display time interval. For example, coding system 102 may use one or more processors 510a, 510b and/or 510n to perform this operation. At 620, coding system 102 cycles through the plurality of codes using the display time interval. Coding system 102 may use one or more processors 510a, 510b and/or 510n and I/O interface 530 (e.g., to display codes) to perform this operation.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: storing a plurality of codes within a security object; detecting, by the security object, a code processing device; based on detecting the code processing device, repeatedly cycling through the plurality of codes, wherein each cycle comprises sequentially displaying, on a display associated with the security object, each code of the plurality of codes; while repeatedly cycling through the plurality of codes, detecting a first signal emitted by a sound emitter associated with the code processing device; based on detecting the first signal, storing an indication of a first code of the plurality of codes displayed when the first signal is emitted; while repeatedly cycling through the plurality of codes, detecting a second signal emitted by the sound emitter; based on detecting the second signal, determining a second code displayed when the second signal is emitted; determining whether one or more codes were displayed by the security object between the first code and the second code; based on determining that the one or more codes were displayed by the security object between the first code and the second code, generating a display time interval, wherein the display time interval enables the code processing device to read each code of the plurality of codes in sequence without failing to read any codes; and cycling through the plurality of codes using the display time interval.

2. Any of the preceding embodiments, further comprising: detecting a connection request from a mobile device associated with the security object; transmitting the plurality of codes to the mobile device; receiving from the mobile device an instruction to remove a code of the plurality of codes, wherein the instruction comprises the code to remove; and removing the code from the plurality of codes.

3. Any of the preceding embodiments, further comprising: detecting a connection request from a mobile device associated with the security object; transmitting to the mobile device the plurality of codes; receiving from the mobile device an instruction to repeat a code of the plurality of codes, wherein the instruction comprises the code to repeat; and adding the code to repeat to the plurality of codes.

4. Any of the preceding embodiments, further comprising, based on detecting the first signal emitted by the code processing device, removing the first code from the plurality of codes.

5. Any of the preceding embodiments, wherein generating the second time interval comprises: determining an elapsed time between the first signal emitted by the code processing device and the second signal emitted by the code processing device; and generating the display time interval based on the elapsed time.

6. Any of the preceding embodiments, wherein cycling through the plurality of codes using the display time interval comprises removing the first code and the second code from the plurality of codes.

7. Any of the preceding embodiments, further comprising scanning each code of the plurality of codes using a scanning device associated with the security object.

8. Any of the preceding embodiments, wherein detecting, by the security object, the code processing device comprises: detecting that the security object has been placed onto a code processing surface; and drawing power from the code processing surface to power the security object.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A security card comprising:
a processor associated with the security card; and
a non-transitory computer-readable storage medium storing instructions, which, when executed by the processor, cause the processor to perform operations comprising:

receiving, by the security card, a plurality of codes scanned by a scanning device;
detecting that the security card has been placed onto a code processing surface;
based on detecting that the security card has been placed onto the code processing surface, repeatedly cycling through the plurality of codes, wherein each cycle comprises sequentially displaying each code of the plurality of codes for a first time interval;
while repeatedly cycling through the plurality of codes, detecting a first sound emitted by a sound emitting device associated with the code processing surface;
based on detecting the first sound, storing an indication of a first code of the plurality of codes displayed when the first sound is emitted;
while repeatedly cycling through the plurality of codes, detecting a second sound emitted by the sound emitting device;
based on detecting the second sound, determining a second code displayed when the second sound is emitted;
determining, based on one or more codes displayed by the security card between the first code and the second code, that the code processing surface failed to read the one or more codes;
in response to determining that the code processing surface failed to read the one or more codes, generating a second time interval based on a time between the first sound and the second sound, wherein the second time interval enables the code processing surface to read each code of the plurality of codes in sequence without failing to read any codes;
removing the first code and the second code from the plurality of codes to generate an updated plurality of codes; and
cycling through the updated plurality of codes at the second time interval.

2. The security card of claim 1, wherein the instructions further cause the processor to perform operations comprising:
detecting a connection request from a mobile device associated with the security card;
transmitting the plurality of codes to the mobile device;
receiving from the mobile device an instruction to remove a code of the plurality of codes, wherein the instruction comprises the code to remove; and
removing the code from the plurality of codes.

3. The security card of claim 1, wherein the instructions further cause the processor to perform operations comprising:
detecting a connection request from a mobile device associated with the security card;
transmitting to the mobile device the plurality of codes;
receiving from the mobile device an instruction to repeat a code of the plurality of codes, wherein the instruction comprises the code to repeat; and
adding the code to repeat to the plurality of codes.

4. The security card of claim 1, wherein the instructions further cause the processor to perform operations comprising:
in response to detecting the first sound, storing a first time corresponding to when the first sound was detected;
in response to detecting the second sound, storing a second time corresponding to when the second sound was detected; and
generating the second time interval based on the first time and the second time.

5. A method comprising:
storing a plurality of codes within a security object;
detecting, by the security object, a code processing device;
based on detecting the code processing device, repeatedly cycling through the plurality of codes, wherein each cycle comprises sequentially displaying, on a display associated with the security object, each code of the plurality of codes;
while repeatedly cycling through the plurality of codes, detecting a first signal emitted by a sound emitter associated with the code processing device;
based on detecting the first signal, storing an indication of a first code of the plurality of codes displayed when the first signal is emitted;
while repeatedly cycling through the plurality of codes, detecting a second signal emitted by the sound emitter;
based on detecting the second signal, determining a second code displayed when the second signal is emitted;
determining whether one or more codes were displayed by the security object between the first code and the second code;
based on determining that the one or more codes were displayed by the security object between the first code and the second code, generating a display time interval, wherein the display time interval enables the code processing device to read each code of the plurality of codes in sequence without failing to read any codes; and
cycling through the plurality of codes using the display time interval.

6. The method of claim 5, further comprising:
detecting a connection request from a mobile device associated with the security object;
transmitting the plurality of codes to the mobile device;
receiving from the mobile device an instruction to remove a code of the plurality of codes, wherein the instruction comprises the code to remove; and
removing the code from the plurality of codes.

7. The method of claim 5, further comprising:
detecting a connection request from a mobile device associated with the security object;
transmitting to the mobile device the plurality of codes;
receiving from the mobile device an instruction to repeat a code of the plurality of codes, wherein the instruction comprises the code to repeat; and
adding the code to repeat to the plurality of codes.

8. The method of claim 5, further comprising, based on detecting the first signal emitted by the code processing device, removing the first code from the plurality of codes.

9. The method of claim 5, wherein generating the second time interval comprises:
determining an elapsed time between the first signal emitted by the code processing device and the second signal emitted by the code processing device; and
generating the display time interval based on the elapsed time.

10. The method of claim 5, wherein cycling through the plurality of codes using the display time interval comprises removing the first code and the second code from the plurality of codes.

11. The method of claim 5, further comprising scanning each code of the plurality of codes using a scanning device associated with the security object.

12. The method of claim 5, wherein detecting, by the security object, the code processing device comprises:

detecting that the security object has been placed onto a code processing surface; and drawing power from the code processing surface to power the security object.

13. A non-transitory, computer-readable medium storing instructions that, when executed by one or more processors, cause the one or more processors to perform operations comprising:

storing a plurality of codes within a security object;

detecting, by the security object, a code processing device;

based on detecting the code processing device, repeatedly cycling through the plurality of codes, wherein each cycle comprises sequentially displaying, on a display associated with the security object, each code of the plurality of codes;

while repeatedly cycling through the plurality of codes, detecting a first signal emitted by a sound emitter associated with the code processing device;

based on detecting the first signal, storing an indication of a first code of the plurality of codes displayed when the first signal is emitted;

while repeatedly cycling through the plurality of codes, detecting a second signal emitted by the sound emitter;

based on detecting the second signal, determining a second code displayed when the second signal is emitted;

determining whether one or more codes were displayed by the security object between the first code and the second code;

based on determining that the one or more codes were displayed by the security object between the first code and the second code, generating a display time interval, wherein the display time interval enables the code processing device to read each code of the plurality of codes in sequence without failing to read any codes; and cycling through the plurality of codes using the display time interval.

14. The non-transitory, computer-readable medium of claim 13, wherein the instructions further cause the one or more processors to perform operations comprising:

detecting a connection request from a mobile device associated with the security object;

transmitting the plurality of codes to the mobile device;

receiving from the mobile device an instruction to remove a code of the plurality of codes, wherein the instruction comprises the code to remove; and removing the code from the plurality of codes.

15. The non-transitory, computer-readable medium of claim 13, wherein the instructions further cause the one or more processors to perform operations comprising:

detecting a connection request from a mobile device associated with the security object;

transmitting to the mobile device the plurality of codes;

receiving from the mobile device an instruction to repeat a code of the plurality of codes, wherein the instruction comprises the code to repeat; and adding the code to repeat to the plurality of codes.

16. The non-transitory, computer-readable medium of claim 13, wherein the instructions further cause the one or more processors to, based on detecting the first signal emitted by the code processing device, remove the first code from the plurality of codes.

17. The non-transitory, computer-readable medium of claim 13, wherein the instructions for generating the second time interval further cause the one or more processors to perform operations comprising:

determining an elapsed time between the first signal emitted by the code processing device and the second signal emitted by the code processing device; and generating the display time interval based on the elapsed time.

18. The non-transitory, computer-readable medium of claim 13, wherein the instructions further cause the one or more processors to cycle through the plurality of codes using the display time interval comprising removing the first code and the second code from the plurality of codes.

19. The non-transitory, computer-readable medium of claim 13, wherein the instructions further cause the one or more processors to scan each code of the plurality of codes using a scanning device associated with the security object.

20. The non-transitory, computer-readable medium of claim 13, wherein the instructions for detecting, by the security object, the code processing device further cause the one or more processors to perform operations comprising:

detecting that the security object has been placed onto a code processing surface; and drawing power from the code processing surface to power the security object.

* * * * *